Sept. 1, 1942.  T. LORD  2,294,674
RUBBER JOINT
Filed March 1, 1940
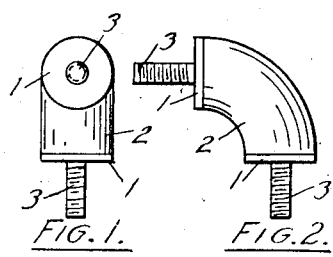
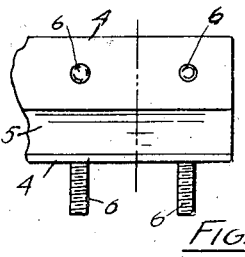
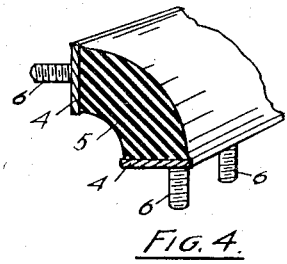
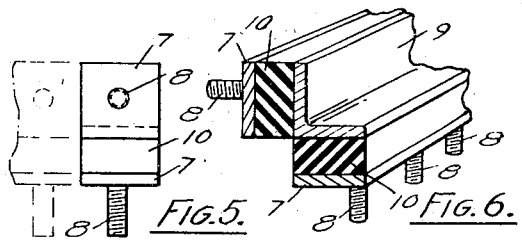
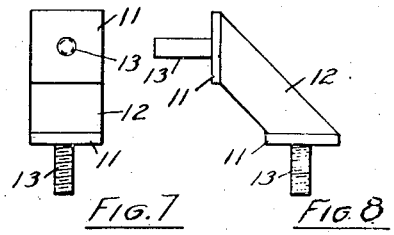
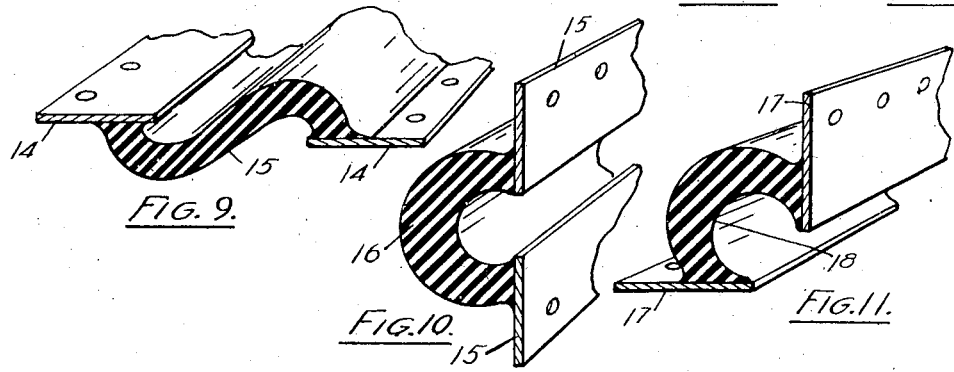
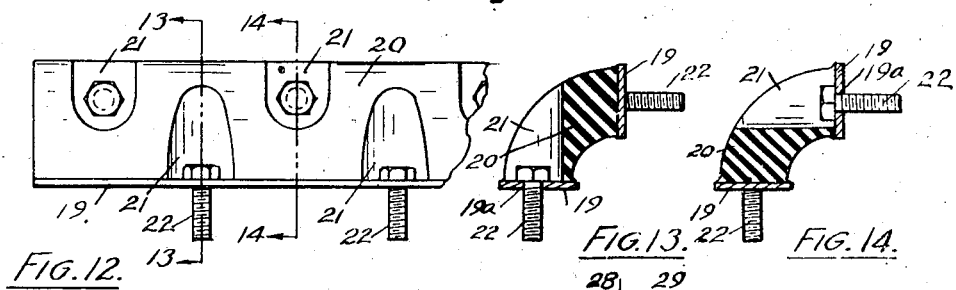
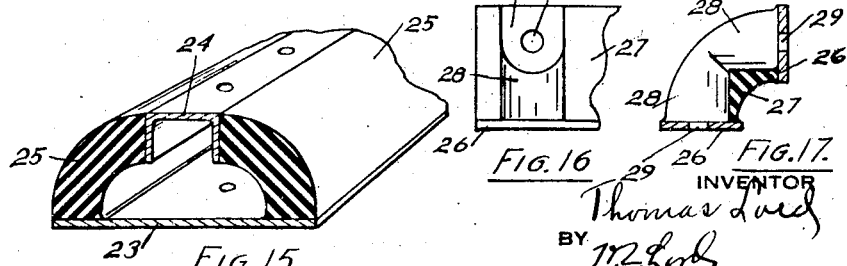
INVENTOR
Thomas Lord
BY
ATTORNEYS Patented Sept. 1, 1942

2,294,674

UNITED STATES PATENT OFFICE 2,294,674

RUBBER JOINT

Thomas Lord, Millcreek Township, Erie County, Pa., assignor, by mesne assignments, to Lord Manufacturing Company, Erie, Pa., a corporation of Pennsylvania Application March 1, 1940, Serial No. 321,701

10 Claims. (Cl. 248—358)

The present invention is designed to provide rubber joints having a rubber connection between connected structures with the rubber so disposed to said structures as to place the rubber in shear in two directions.

Preferably the supports are arranged at an angle to each other and in the carrying forward of the invention these structures may be elongated or may be united. Further features and details of the invention will appear from the specification and claims.

Preferred embodiments of the invention are illustrated in the accompanying drawing as follows:

Fig. 1 shows a front elevation of a joint having plate supports being offset and at an angle and with an all rubber connection between these plates.

Fig. 2 a side view of the same structure.

Fig. 3 a joint having elongated supporting plates offset and at an angle to each other with a rubber connection between the plates.

Fig. 4 a perspective view of the structure illustrated in Fig. 3.

Fig. 5 a structure having plates offset and at an angle and a connecting structure including rubber secured to the plates and an angle plate arranged intermediately of the rubber.

Fig. 6 a perspective view of the structure shown in Fig. 5.

Fig. 7 a front elevation of a joint having plates offset and at an angle to each other and a rubber connecting said plates inclined to both plates.

Fig. 8 a side view of the structure shown in Fig. 7.

Fig. 9 a joint having plates in alignment and a rubber connection between the plates providing shear in all directions between the plates.

Fig. 10 a perspective view of the plates in alignment with connecting rubber providing for shear in several directions.

Fig. 11 a perspective view of a joint provided with two plates offset and at an angle to each other and a rubber connection between the plates.

Fig. 12 a front elevation of a joint having two elongated plates offset and at an angle to each other and a rubber connection between the plates, said rubber having openings exposing perforations for securing the plates.

Fig. 13 a section on the line 13—13 in Fig. 12.

Fig. 14 a section on the line 14—14 in Fig. 12.

Fig. 15 a double joint providing plate structures offset and at an angle and connecting rubber members between these structures.

Fig. 16 a joint having plates offset and at an angle to each other, said plates being perforated, the perforations being substantially in the same plane and the rubber being notched to expose the perforations.

Fig. 17 a section on the line 17—17 in Fig. 16.

In Figs. 1 and 2, 1—1 marks plates which are arranged in planes offset and at an angle to each other; 2 a rubber connection bonded to the surfaces of the plates; 3 pins extending from the plates providing means for securing the plates to parts to be connected.

Figs. 3 and 4 have strips 4—4 in planes offset and at an angle to each other and rubber connections 5 between the plates, the plates being provided with pins 6 at intervals to provide means for connecting the plates to the parts to be connected.

In Figs. 5 and 6, the plates 7, arranged at an angle to each other and having securing screws 8, are joined through angularly disposed rubber elements 10 through the plate 9. It will be noted that the rubber elements are in shear relation to each other so that direct shear action is effected in three directions.

Figs. 7 and 8 have plates 11—11 in planes offset and at an angle to each other, a rubber member 12 secured to said plates, and an incline between said plates, the plates being provided with pins as securing means for securing the joint to the parts to be connected.

In the structure illustrated in Fig. 9, plates 14—14 are shown in the plane, and an S-shaped connecting rubber member connects opposite faces of said plates providing shear connections in the rubber with a movement of the plates to and from each other, lengthwise of each other, and in directions at right angles to each other.

In the structure shown in Fig. 10, two plates 15—15 are arranged in the same plane and connected by a U-shaped rubber member 16 secured to the plates, thus providing shear with a movement of the plates to and from each other, laterally from each other, or endwise.

In the structure shown in Fig. 11, there are provided two plates 17—17 arranged in planes offset and at an angle to each other, and a rubber member 18 of U shape connected to the more adjacent faces of the plates, thus providing shear in the several directions with relative movement of the plates.

In the structures shown in Figs. 12, 13 and 14, a strip joint is provided having the plates 19—19 in planes offset and at an angle to each other, a rubber member 20 connecting said plates, the rubber member having openings 21 exposing perforations 19a in the plates through which screws 22 may be extended for securing the joint.

Fig. 15 shows a double application of the general scheme. In this structure, a channel 24 is arranged above a plate 23. The plate 23 may be one plate for both sides or separated. The sides of the channel 24 and the plate 23 are connected by rubber members 25, the faces of the connection and the rubber member being offset and at an angle to each other, providing free shear movement in the several directions.

Figs. 16 and 17 illustrate a joint having plates 26—26 arranged in planes offset and at an angle to each other, a rubber member 27 connecting said plates, the rubber member being notched exposing perforations 29 in the plates, these perforations being in substantially the same plane whereby short individual plates may be readily secured. These structures, formed in a very simple manner, provide for joint connections giving shear in three directions.

It will be noted that in most of the structures the plates are at an angle to each other and that also in most of the structures the portions of the projections adjacent to each plate are out of alignment. The effect of this is to sustain the major thrust of each plate in the direction of the plane of the face of the plate through shear resistance.

It will be noted that in these structures there is a portion of the resilient rubber element which is out of direct compression relation between the plates so that the intervening rubber member is free to respond in shear with relation to both plates.

What I claim as new is:

1. The combination of two plates and a yielding connection between the plates including rubber or the like projecting from the faces of the plates in shear relation relatively to the face of each plate and out of direct line compression relation between the plates the general direction of the portions of the connection adjacent to the plates being out of alignment and sustaining the major portion of the thrust of each plate in the plane of the face of the plate.

2. The combination of two plates and a yielding connection between the plates formed of rubber or the like projecting from the faces of the plates in shear relation relatively to the face of each plate and out of direct line compression relation between the plates the general direction of the portions of the connection adjacent to the plates being out of alignment and sustaining the major portion of the thrust of each plate in the plane of the face of the plate.

3. The combination of two plates in planes offset and at an angle to each other, and a yielding connection between the plates including rubber or the like projecting from the faces of the plates in shear relation relatively to the face of each plate and out of direct line compression relation between the plates and sustaining the major portion of the thrust of each plate in the plane of the face of the plate.

4. The combination of two plates in planes offset and at an angle to each other, and a yielding connection between the plates formed of rubber or the like projecting from the faces of the plates in shear relation relatively to the face of each plate and out of direct line compression relation between the plates and sustaining the major portion of the thrust of each plate in the plane of the face of the plate.

5. The combination of two plates and a yielding connection between the plates including rubber or the like projecting from the faces of the plates in shear relation relatively to the face of each plate and out of direct line compression relation between the plates the general direction of the portions of the connection adjacent to the plates being out of alignment, and securing pins extending from the free faces of the plates.

6. The combination of two plates; a yielding connection between the plates including rubber or the like projecting from the faces of the plates in shear relation relatively to the face of each plate and out of direct line compression relation between the plates the general direction of the portions of the connection adjacent to the plates being out of alignment, said plates being provided with perforations and the rubber member with openings exposing the perforations.

7. The combination of two plates and a yielding connection between the plates including rubber or the like, the connection including an angle plate, each side of the angle facing an opposing plate, the rubber being secured to the sides of the angle and the plates connected.

8. The combination of a channel; rubber members projecting outwardly from the sides of the channel and extending downwardly to below the channel; and a supporting structure facing upwardly, the rubber members being secured to the faces of the channel and the supporting structure the secured portions of the rubber members in the supporting structure being offset from the channel.

9. The combination of a supporting member having spaced upwardly faced supporting surfaces, a cushion member of arch form having its ends secured to the supporting surfaces, and a load carrying member secured to the cushion member, said load carrying member being offset from the ends of the arch on the supporting surfaces and the cushion member between the surfaces and load carrying member being of resilient material such as rubber.

10. The combination of a supporting member having spaced upwardly faced supporting surfaces, a cushion member of arch form having its ends secured to the supporting surfaces, and a load carrying member having opposing outwardly facing surfaces secured to the cushion member, said load carrying member being offset from the ends of the arch on the supporting surfaces and the cushion member between the surfaces and load carrying member being of resilient material such as rubber.

THOMAS LORD.